UNITED STATES PATENT OFFICE.

MYRON A. HUNT, OF WRIGHT'S GROVE, ILLINOIS.

MANUFACTURE OF BRICK AND OTHER BURNED PRODUCTS OF CLAY.

SPECIFICATION forming part of Letters Patent No. 345,305, dated July 13, 1886.

Application filed January 30, 1886. Serial No. 190,378. (Specimens.)

*To all whom it may concern:*

Be it known that I, MYRON A. HUNT, a citizen of the United States, residing at Wright's Grove, in the county of Cook and State of Illinois, have invented a new and useful Improvement in the Manufacture of Brick and other Burned Products of Clay, of which the following is a specification.

My invention relates particularly to ordinary building-brick, yet it may be used with advantage and beneficial results with all burned products of clay.

The object of my invention is to counteract or quiet the exudations in brick and other burned products of clay. The invention also has the object to improve the brick or other product in general appearance, in strength, and durability; and to this end my invention consists, first, in the improved manufacture of surface-coating the unburned brick or other product with oil, causing a surface absorption of oil, and drying, and afterward burning same; and, second, a brick or other clay product having an oil coating or covering before being burned; and, third, a brick or other burned product of clay having an oil-hardened exterior part with a softer interior part.

Heretofore oil has been mixed with clay preparatory to forming brick and other products, which were afterward burned. In such mixing the oil was mixed thoroughly in the clay before forming the product, by which the oil was evenly distributed throughout the brick or product. In such mixing use of oil in clay it was found that the oil injured the coherency of the clay, burned quicker, and hardened the product, and the more oil used the less cohesive the clay, the quicker burned, and the harder the product; also the more oil used the more sand-like non-adhesive the clay and the more brittle-hard the burned product, and it was found that only the smaller quantity of oil could be used without making the product open porous, non-adhesive, sand-like, and brittle-hard, unfit for use, and that when such smaller quantity of oil was evenly mixed thoroughly in the clay it did not satisfactorily counteract and bar the exuding matter in the brick after being burned. It is to overcome these troubles and objections that I have improved the manufacture and product as herein set forth.

To carry my invention into effect I preferably take a portion of clay sufficient for a brick or other product and place it in a vat of petroleum-oil, after which the said portion may be placed in a mold or former and form a brick or other product, by which the said brick or other product will have its surface completely and thickly covered with oil, after which the so formed brick or other product may be dried and burned in any usual manner.

Another preferred way or method may be to first form the brick or other product and partially dry same, then place it in a vat of petroleum-oil, after which more or less time for the oil to penetrate and drip may be allowed, then to place it in a press and compact it into a pressed brick, after which it may be dried and burned in any usual manner.

Any method of surface-covering the unburned product with oil, either before or after complete forming, may be used, as painting, dipping, showering, or otherwise, and any and all kinds of burned products of clay may thus be surface coated with oil before being burned with beneficial results. I preferably use petroleum-oil, partly from its cheapness, its hardening quality, and its assisting materially as fuel in burning. In the drying of the oil-covered brick or other product the oil will be more or less absorbed, causing a superficial absorption of the oil to a more or less depth in a stratum exterior part and become incorporated with the clay in a dense-like stratum exterior part without damaging its cohesiveness, and then in the burning to become fixed permanently unremovable, which will prevent or neutralize the exudations, so that thereafter no exudations will take place, and the said surface and exterior stratum part made the harder, better surfaced and color, and a stronger and more durable product produced than heretofore.

It being well known and common to use oil mixed thoroughly in clay in making brick and other products of clay, I do not herein claim such.

Having thus set forth my invention, I claim—

1. The method of manufacturing brick and other burned products of clay, which consists in first partially forming such product, then coating same with oil, and afterward forming, drying, and burning said product.

2. The method of making brick and other burned products of clay, which consists in coating the surface of said product with oil before burning such product.

3. A brick or other product of clay having an oil-coated surface before being burned.

4. A brick or other burned product of clay having an oil-coat, hardened exterior, with softer interior.

MYRON A. HUNT.

Witnesses:
 RUFUS C. HALL,
 G. E. DEMING.